Dec. 13, 1966    E. B. GRAVES ETAL    3,291,985
VIEWING APPARATUS FOR INTENSIFIED X-RAY IMAGES
HAVING AN IMPROVED OPTICAL SYSTEM
Filed Aug. 5, 1964    2 Sheets-Sheet 1

INVENTORS
EDWARD B. GRAVES &
EDGAR J. BASTIN
BY
*Watts & Fisher*
ATTORNEYS.

Dec. 13, 1966 E. B. GRAVES ETAL 3,291,985
VIEWING APPARATUS FOR INTENSIFIED X-RAY IMAGES
HAVING AN IMPROVED OPTICAL SYSTEM
Filed Aug. 5, 1964 2 Sheets-Sheet 2
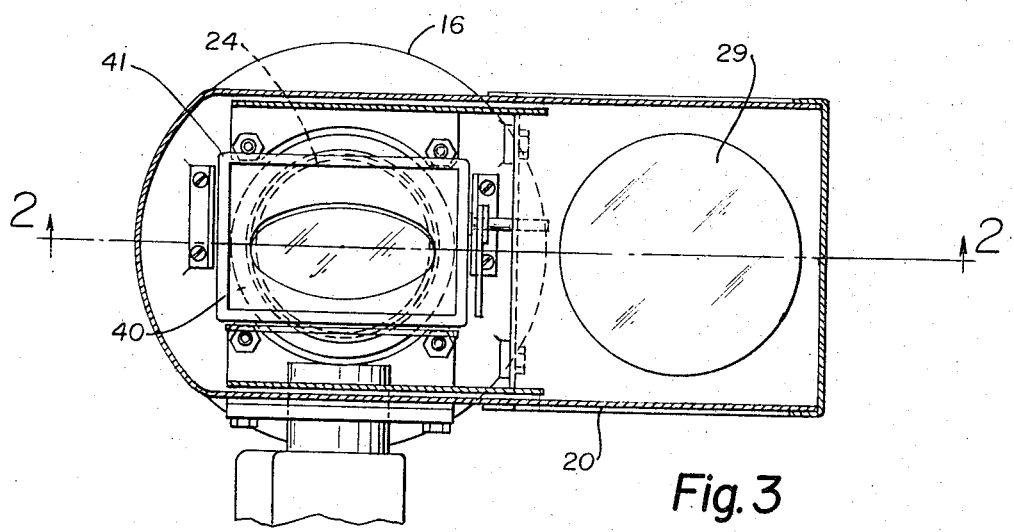
Fig. 3
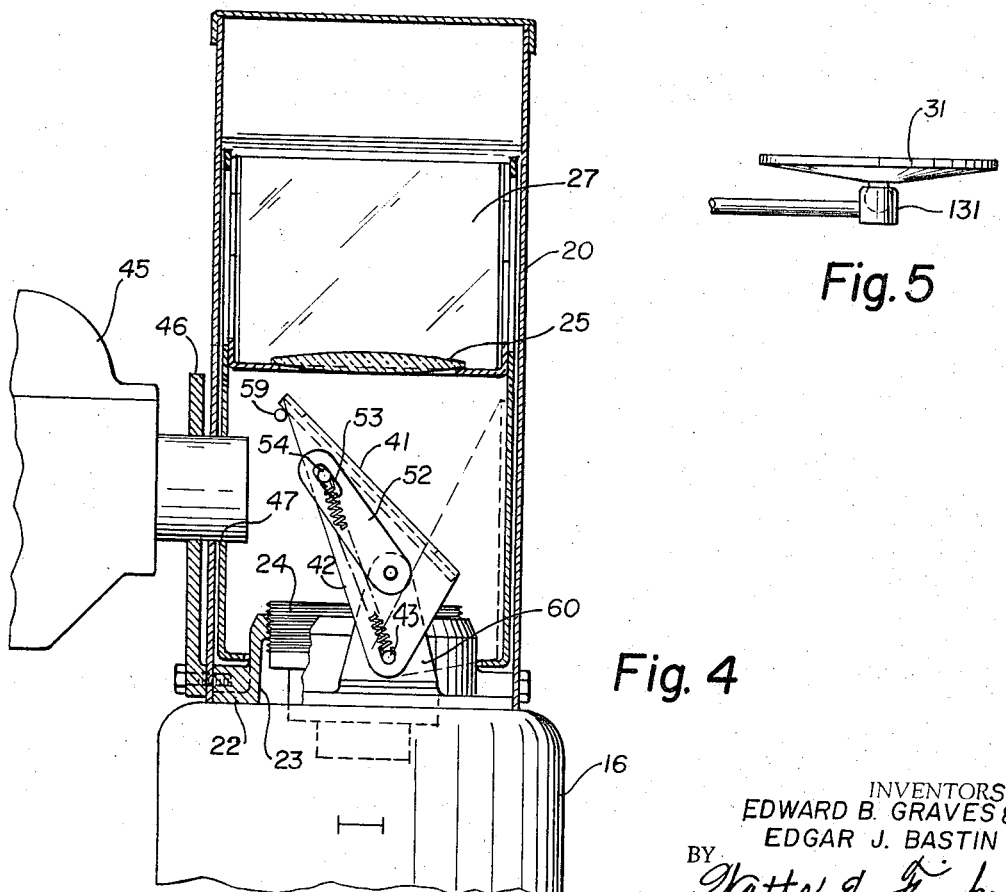
Fig. 4
Fig. 5
INVENTORS
EDWARD B. GRAVES &
EDGAR J. BASTIN
BY
ATTORNEYS

United States Patent Office 3,291,985
Patented Dec. 13, 1966

3,291,985
VIEWING APPARATUS FOR INTENSIFIED X-RAY IMAGES HAVING AN IMPROVED OPTICAL SYSTEM
Edward B. Graves, South Euclid, and Edgar J. Bastin, Chesterland, Ohio, assignors to Picker X-Ray Corporation, Waite Manufacturing Division, Inc., Cleveland, Ohio, a corporation of Ohio
Filed Aug. 5, 1964, Ser. No. 387,720
2 Claims. (Cl. 250—77)

This invention relates to X-ray apparatus and more specifically to an image intensification system for providing an intensified fluoroscopic image.

In modern medical X-ray diagnostic equipments, it is relatively common to use image intensification tubes. These tubes are used to amplify a fluoroscopic image for TV, cine, and/or optic viewing. This invention is directed to those equipments having optic and cine viewing where the operator may view the amplified image in a mirror and may selectively take cine or motion pictures of the image.

One prior arrangement for medical diagnosis with an image intensifier is shown in U.S. Patent No. 3,018,375, issued January 23, 1962, to E. B. Graves and E. J. Bastin under the title, Viewing Apparatus for Amplified X-Ray Images.

As shown in that patent, the image tube is mounted on a spot filmer. The spot filmer in turn is mounted on a movable tower of an X-ray table of the tiltable type. The spot filmer is movably mounted on the tower so that it may be selectively moved toward and away from the table top on which a patient rests. Since the tower is movable, the spot filmer is movable with it both longitudinally and transversely of the table top. The table is tiltable from a position in which the table top is horizontal to one in which it is vertical. Usually these tables are also tiltable in the opposite direction at least fifteen degrees and as much as ninety degrees.

When an image intensification tube is equipped for optical viewing, it is necessary to provide a suitable optic system for focusing the image and for directing it against a viewing mirror.

In the typical apparatus, an optic system housing is journaled on the image intensification tube housing near the output end of the tube. The optic housing is rotatable about the axis of the output end of the tube. The viewing mirror is suspended from and depends from the optic housing. Often the viewing mirror will be supported on an arm which is rotatable with respect to the optic housing and in addition the mirror is adjustable on the arm. With the prior art structures, the image directed toward the mirror is directed along an axis which essentially parallels the axis of the image tube.

With prior art structures, when the table top is in a vertical position, it is almost essential for efficient operation of the device that the viewing mirror be in front of the image intensification tube. If the optic housing and mirror are left in this position when the table is moved to a horizontal position, there are two principal inherent disadvantages. The first is, that the optic housing projects outwardly from the image tube sufficiently that it obstructs the free movement of the physician or other operator. The physician cannot, for example, bend over the patient and view the mirror because the optic housing is in the way. Moreover, because the mirror is supported on a relatively short arm so that it will clear the spot filmer and the like as the optic housing is rotated, the mirror is in a very inconvenient position for such studies. Accordingly, the doctor must rotate the optic housing until it is projecting laterally to one side from the image tube and out of his way. He must then adjust the mirror until it is in a convenient position where he can view the image. When adjusted to its optimum, one of these prior devices did not produce the facility and convenience with the table in the horizontal position that is obtained by the present construction.

The present construction has a further advantage of providing an optic housing that is fixed. The mirror is positioned essentially in the plane of the input end of the image tube forwardly on the spot filmer. The optic system directs the image to the viewing mirror along on axis which diverges, in the direction of the mirror, from the axis of the image tube. With this construction, it is possible, for the first time, for the doctor to conveniently see the viewing mirror either in the horizontal or the vertical position without any adjustment of the optic housing. Moreover, in many cases it is possible to look conveniently into this viewing mirror, without any adjustment of the mirror, when the table is tilted from the horizontal to the vertical or vice versa.

Accordingly, the object of this invention is to provide a novel and improved optic system for use with an image intensification tube which greatly simplifies optic studies.

Other objects and a fuller understanding of the invention may be had by referring to the following description and claims taken in conjunction with the accompanying drawings in which:

Figure 2:
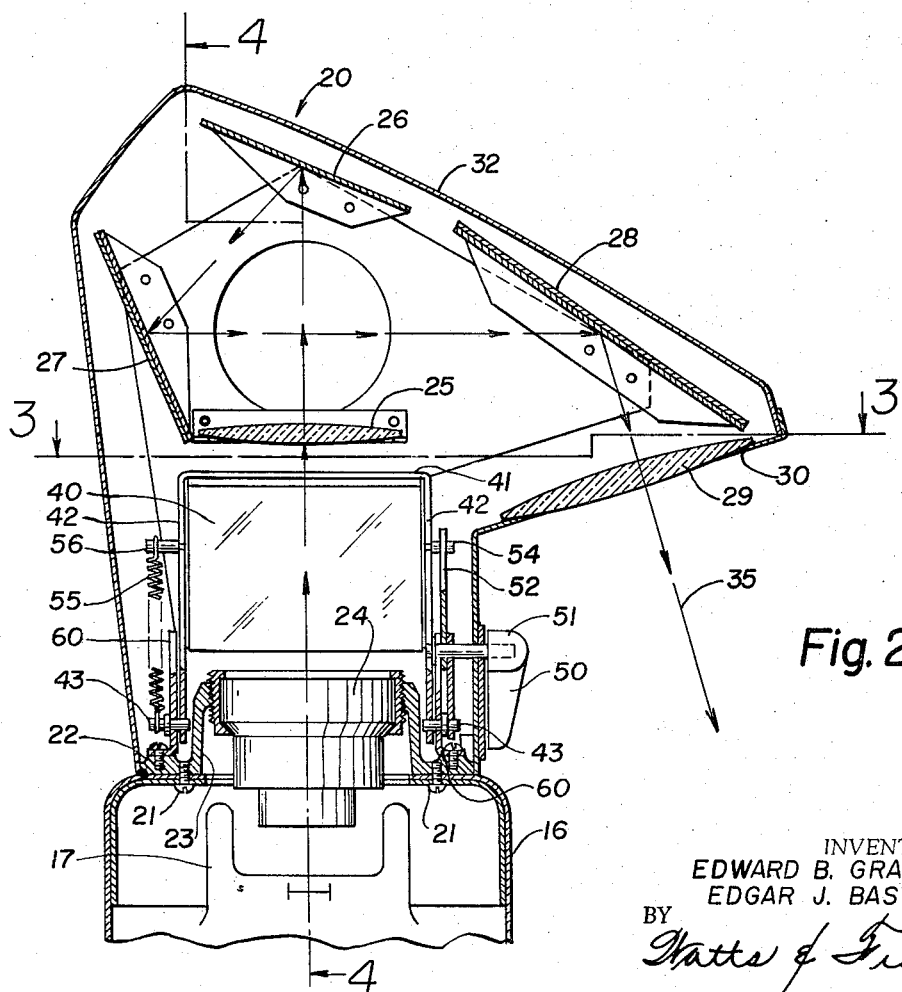
FIGURE 2 is a sectional view, on an enlarged scale with respect to FIGURE 1, of the optic housing and components contained within it.

FIGURES 3 and 4 are sectional views on the scale of FIGURE 2 as seen from the planes indicated by the lines 3—3 and 4—4 of FIGURE 2; and, FIGURE 5 is an enlarged fragmentary view of the mirror support.

Figure 1:
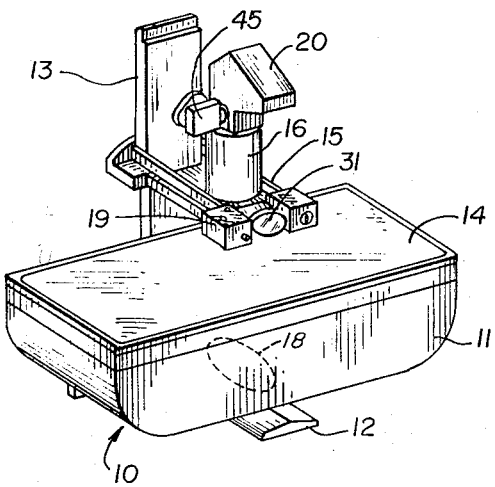
FIGURE 1 is a perspective view of an X-ray examination table equipped with a mechanism of this invention.

Referring now to the drawings and FIGURE 1 in particular, an X-ray examination table is shown generally at 10. The table 10 has a body 11 which is tiltably supported on a pedestal 12. The table is preferably of the type described and claimed in United States Patent No. 2,872,584, issued February 3, 1959, to R. C. Schiring et al.

A tower 13 is movably carried by the table body for movement parallel to a top 14 of the body 11 along both longitudinal and transverse paths with respect to the top 14. An assembly 15 is mounted on the tower 13 for reciprocation toward and away from the top 14. The assembly 15 is preferably a spot filmer such as that described and claimed in United States Patent No. 2,668,913, issued February 9, 1954, under the title, Spot Filmer.

An image intensification tube housing 16 is mounted on the spot filmer 15. The image tube housing 16 encases an image intensification tube the output end of which is shown at 17 in FIGURE 2. The image tube has an input end, not shown, which is substantially in the plane of a connection at 19, FIGURE 1, between the input end of the image tube housing 16 and the spot filmer 15. The image tube is aligned with an X-ray tube 18 conventionally mounted on the tower 13.

As is best seen in FIGURE 2, an optic system housing 20 is rigidly fixed to the image tube housing 16 as by screws 21. The optic housing 20 includes a base plate 22 which defines an input window 23. An input lense 24 is threaded into the base plate 22 and positioned in the input window 23 in alignment with the output end 17 of the image tube. The image output of the intensification tube passes along the line designed by a dash line and arrow heads in FIGURE 2. Thus, the image passes up through the input lense 24 then through a first focusing lense 25. The image passes from the first focusing lense 25 against a first reflecting mirror 26 which reflects the image against a second deflecting mirror 27. The image then travels substantially horizontally, when the table is horizontal, against a third and final reflecting mirror 28 which diverts the image downwardly through an output focusing lense 29 thence through an output window 30 defined by the housing 20, along a path 35, and against a viewing mirror 31. The lenses 25, 29, and the mirrors 26, 27 and 28, are all fixed in the housing.

The construction is a compact and convenient construction in which the first and third reflecting mirrors 26, 28 are substantially in abutment with one another and positioned adjacent a sloping upper wall 32 of the housing 20. The second reflecting mirror 27 is positioned such that it is just out of the path of the focusing lense 25 but as close to the axis of the image tube as is possible so that the over all arrangement is highly compact. The output lense 29 is positioned as near to the input lense 24 as is practical but canted at an angle such that the output image is directed along the path 35 divergent, in the direction of the viewing mirror, from the axis of the image tube.

The viewing mirror 31 is preferably supported in an adjustable fashion, as by a conventional ball and socket arrangement shown at 131 in FIGURE 5. The viewing mirror 31 is positioned at the front of the assembly 15 substantially in the plane of the input end of the image tube and, therefore, substantially in the plane of the connection 19 of the input end of the image tube housing 16. With the viewing mirror 31 so positioned, a doctor or other operator can conveniently view it in either the horizontal or the vertical positions of the table without interference of the optic housing 20. Accordingly, the optic housing 20 is, for the first time in an image system used in combination with the tiltable table, fixed relative to the tube housing 16, while permitting both horizontal and vertical convenient use.

A beam splitter 40 is mounted on a bracket 41. The bracket 41 is equipped with a pair of depending flanges 42. The flanges 42 are pivotally mounted on a pair of pivot pins 43, FIGURE 2. The beam splitter 40 and its mounting 41 have a reflecting position shown in solid lines in FIGURE 4 where the splitter is in the path of the output of the image tube. When in this reflecting position, the beam splitter will reflect a portion of the light image and transmit another portion through the optic for the operator to view in the viewing mirror. The reflected portion of the image is directed into a cine camera 45. The camera is positioned with its input lense along an axis that is normal to the image tube axis. The camera is supported by a suitable bracket 46 and it projects through a camera window 47 in the optic housing 20. The camera 45 projects laterally to one side of the optic housing 20 as is best seen in FIGURE 1.

The beam splitter and its mounting 41 are shiftable from the solid line reflecting position of FIGURE 4 to a storage position shown in phantom. When the beam splitter is in its storage position, all of the output of the image tube is directed to the viewing mirror 31.

Shifting of the beam splitter from its reflecting to its storage position and return is effected by actuating a handle 50, FIGURE 2. The handle 50 is mounted on a rotatable shaft 51. A splitter actuating link 52 is fixed to the shaft 51 for rotation when the handle 50 is rotated. The link 52 has an elongated slot 53 which receives and engages a splitter positioning pin 54. The splitter positioning pin 54 is fixed to the beam splitter and is slidable, relatively, in the slot 53. A splitter positioning spring 55 is secured to the left hand one of the pivot pins 43, as viewed in FIGURE 2. The spring 55 is also connected to a spring pin 56 mounted on the left hand one, as viewed in FIGURE 2, of the flanges 42. The spring pin 56 is preferably on an axis which is an extension of the axis of the actuating pin 54 so that with an over center arrangement, the spring biases the beam splitter selectively one at a time into its reflecting and storage positions. A suitable stop 59, FIGURE 4, is provided to locate the reflecting position of the beam splitter.

The entire beam splitter assembly is supported by a pair of splitter support brackets 60 which are fixed to the base 22 of the optic housing 20. The right hand one of the bracket 60, as viewed in FIGURE 2, is the bracket plainly visible in FIGURE 4. This right hand one of the brackets 60 journals the right hand one of the beam splitter pivot pins 43 and the handle pin 51. The left hand one of the brackets journals the left hand one of the pivot pins 43.

While the invention has been described with detail, it is believed that it essentially comprises an X-ray apparatus, in which an image intensification tube is used. A viewing mirror is secured to the image tube to one side of the tube and substantially in the plane of the input end. An optic system is fixed to the output end of the image tube to receive and reflect the image against the viewing mirror. This system also encompasses the use of an over center linkage and a beam splitter for selectively directing the image to a cine camera while permitting optic viewing.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In an X-ray table including a body tiltable from horizontal to vertical and return, a patient supporting top on the body, and a tower movable relative to the body along paths paralleling the table top, an image tube support structure reciprocally mounted on the tower for movement toward and away from the top, an image intensification tube and housing mounted on the support structure, the tube having input and output ends, and an optic system mounted on the tube housing near the output end to receive an ouput image, the improvement comprising:
    (a) a viewing mirror mounted on said structure substantially in the plane of the input end of the image tube;
    (b) said optic system being fixedly connected to the image tube housing;
    (c) said optic system including means to receive an image from the output of said image tube and directed downwardly against said viewing mirror; and
    (d) said optic means being constructed such that said image directed against said viewing mirror is angled outwardly with respect to the axis of the image tube as it is directed downwardly onto the viewing mirror.

2. The device of claim 1 wherein said optic system comprises:
    (a) an optic assembly housing fixed to said image tube housing and defining an input window aligned with said image tube;

(b) said optic housing having a visual image output window laterally spaced from said input window and having an axis canted at an angle with respect to the axis of the input window;

(c) input and output lens means respectively mounted in said input and output windows;

(d) mirrors positioned within said image housing to reflect an image received from said input lens means and direct the image outwardly through said output lens means along said output window axis;

(e) a beam splitter support mounted in said optic housing;

(f) said support being movable selectively, one at a time, into image and storage position;

(g) a beam splitter carried by said splitter system and positioned, when the support is in the image position, in the path of an image emitted by said input lens means; and, (h) said optic assembly housing having a camera window at one side thereof, said beam splitter when in the image position being positioned to reflect an image received from said output lens means through said camera window.

References Cited by the Examiner

UNITED STATES PATENTS

| | | | |
|---|---|---|---|
| 2,922,336 | 1/1960 | Van Alphen et al. | 250—77 X |
| 2,972,681 | 2/1961 | Lusby et al. | 250—77 X |
| 3,018,375 | 1/1962 | Graves et al. | 250—77 |
| 3,215,835 | 11/1965 | Mueller | 250—57 X |

RALPH G. NILSON, *Primary Examiner.*

ARCHIE R. BORCHELT, *Examiner.*

S. ELBAUM, *Assistant Examiner.*